US012578520B2

(12) United States Patent
Tanaka et al.

(10) Patent No.: US 12,578,520 B2
(45) Date of Patent: Mar. 17, 2026

(54) WAVELENGTH TUNABLE OPTICAL FILTER

(71) Applicant: NTT, Inc., Tokyo (JP)

(72) Inventors: Yurina Tanaka, Tokyo (JP); Takashi Sakamoto, Tokyo (JP); Yuichi Akage, Tokyo (JP); Soichi Oka, Tokyo (JP)

(73) Assignee: NTT, INC., Tokyo (JP)

( * ) Notice: Subject to any disclaimer, the term of this patent is extended or adjusted under 35 U.S.C. 154(b) by 397 days.

(21) Appl. No.: 18/261,008

(22) PCT Filed: Jan. 13, 2021

(86) PCT No.: PCT/JP2021/000807
§ 371 (c)(1),
(2) Date: Jul. 11, 2023

(87) PCT Pub. No.: WO2022/153389
PCT Pub. Date: Jul. 21, 2022

(65) Prior Publication Data
US 2024/0319419 A1     Sep. 26, 2024

(51) Int. Cl.
*G02B 5/28* (2006.01)
(52) U.S. Cl.
CPC ...................................... *G02B 5/28* (2013.01)
(58) Field of Classification Search
CPC ...................................... G02B 5/28; G02B 5/26
See application file for complete search history.

(56) References Cited

U.S. PATENT DOCUMENTS 6,545,739 B1 *  4/2003  Matsumoto ........ G02B 6/29358
349/198
10,031,396 B2 *  7/2018  Campbell .............. H04N 23/55

FOREIGN PATENT DOCUMENTS

JP      2011091209 A    5/2011
JP      2013195916 A    9/2013
JP      2017126037 A    7/2017

OTHER PUBLICATIONS

Imai, et al., "Anomalous index modulations in electrooptic KTa1-xNbxO3 single crystals in relation to electrostrictive effect," Optics Express, Nov. 2, 2015, vol. 23, No. 22, pp. 28784-28791. As discussed in the specification.

(Continued)

*Primary Examiner* — Balram T Parbadia
(74) *Attorney, Agent, or Firm* — Slater Matsil, LLP

(57)                   ABSTRACT
A wavelength-tunable optical filter includes a plate-like first component, a plate-like second component, a first reflective film, and a second reflective film. The wavelength-tunable optical filter also includes a first transparent electrode and a second transparent electrode that serve as a voltage applying part that applies a voltage in the thickness direction of the first component, and as a charge injecting part that injects electric charge into the first component. The first transparent electrode is formed on a first incident surface, and is ohmically connected to the first component. The second transparent electrode is formed between a first emission surface and the first reflective film, and is ohmically connected to the first component.

20 Claims, 13 Drawing Sheets

(56) References Cited

OTHER PUBLICATIONS

Kawamura et al., "Temperature independent electrostrictive coefficients K0.95Li0.05Ta0.73Nb0.27O3 single crystals," Journal of Applied Physics. Appl. Phys. 122, Sep. 2017, 4 pages. As discussed in the specification.

Milne et al., "Widely Tunable MEMS-Based Fabry-Perot Filter", Journal of MicroElectroMechanical Systems, vol. 18, No. 4, Aug. 2009, pp. 905-913. As discussed in the specification.

* cited by examiner $$E_{z(in)}(z) = \frac{\rho}{\varepsilon_0 \varepsilon_r} z$$

$$E_z(z) = \frac{\rho}{\varepsilon_0 \varepsilon_r} z + \frac{V}{d}$$

WAVELENGTH TUNABLE OPTICAL FILTER

CROSS-REFERENCE TO RELATED APPLICATIONS

This application is a national phase entry of PCT Application No. PCT/JP2021/000807, filed on Jan. 13, 2021, which application is hereby incorporated herein by reference.

TECHNICAL FIELD

The present invention relates to a wavelength-tunable optical filter of a Fabry-Perot interferometer type.

BACKGROUND

A wavelength-tunable optical filter capable of selecting a desired transmission wavelength is used as the basic technology of a laser application, such as control on the oscillation wavelength of a laser. Optical imaging is known as a laser application technique using a wavelength-tunable optical filter. Optical coherence tomography (OCT) is widely used, being capable of visualizing the inside of a living body or the like in a non-destructive and non-contact manner using optical interference. Some light sources used in OCT form wavelength-swept light sources by sweeping of a wavelength-tunable optical filter in each light source, and the speed of imaging is determined by the sweeping speed of the wavelength-tunable optical filter. Furthermore, since the wavelength sweep width determines the measurement resolution, a wavelength-tunable optical filter having a higher speed and a wider sweep width is required.

For example, there is a wavelength-tunable optical filter using a MEMS mirror and a diffractive element (Patent Literature 1). By this technique, the incident angle of light entering the diffractive grating is changed by the MEMS mirror, so that the wavelength of reflected light changes. By this technique, the angle of the MEMS mirror can be greatly changed, and a wide filterable wavelength band can be secured accordingly. However, the driving speed is about several tens of kHz, and the configuration is as large as several tens of cm.

Also, there is a wavelength filter that uses the electrostatic force of a MEMS (Non Patent Literature 1). By this technique, a mirror is fixed to a flexible beam to change the resonator length, and functions as a wavelength filter. The MEMS mechanism that uses an electrostatic force is smaller than the above-described wavelength-tunable optical filter, and can sweep a wide wavelength band at high speed. However, the MEMS mechanism has a complicated configuration, and has problems in beam manufacturing accuracy and the like.

Further, a wavelength-tunable optical filter using an electrostrictive crystal has been suggested (Patent Literature 2). By this technology, a filter having a simple configuration can be formed, and high-speed operations at several hundreds of kHz can be performed.

CITATION LIST

Patent Literature

Patent Literature 1: JP 2011-091209 A
Patent Literature 2: JP 2017-126037 A

Non Patent Literature

Non Patent Literature 1: J. S. Milne et al., "Widely Tunable MEMS-Based Fabry-Perot Filter", Journal of MicroElectroMechanical Systems, vol. 18, no. 4, pp. 905-923, 2009.

SUMMARY

Technical Problem

However, in a case where the wavelength sweep width is 100 nm in the wavelength-tunable optical filter using an electrostrictive crystal, the drive voltage is as high as 400 V (Patent Literature 2). A commercial voltage source capable of high-speed driving at several hundreds of kHz to MHz can obtain only an output of about 100 Vpp, which makes it difficult to put the voltage source into practical use. Also, the size of a high-voltage source is normally large, and therefore, its application range might be limited. Furthermore, the amount of heat generation of a device is proportional to the square of the voltage. Therefore, in a case where the drive voltage is high, heat generation of the device is also large, which might lead to a need for a more sophisticated cooling mechanism, or an abnormal operation in a case where cooling is not sufficient. As described above, to achieve high-speed driving, a conventional wavelength-tunable optical filter using an electrostrictive crystal is difficult to put into practical use, and requires a high drive voltage that makes a normal operation difficult.

Embodiments of the present invention have been made to solve the above problems, and aims to lower the drive voltage of a wavelength-tunable optical filter that uses an electrostrictive crystal.

Solution to Problem

A wavelength-tunable optical filter according to embodiment of the present invention includes: a plate-like first component including a first incident surface and a first emission surface disposed on the side opposite to the first incident surface, the first component being formed with a material that has an electrostrictive effect and transmits light, the first incident surface and the first emission surface being disposed on the optical axis; a plate-like second component including a second incident surface and a second emission surface disposed on the side opposite to the second incident surface, the second component being formed with a material that transmits the light, the second incident surface and the second emission surface being disposed on the optical axis, the distance between the first incident surface and the second incident surface being constant on the optical axis; a first reflective film that is formed on the first emission surface and partially reflects the light; a second reflective film that is formed on the second incident surface and partially reflects the light; a voltage applying part that applies a voltage in the thickness direction of the first component; and a charge injecting part that injects electric charge into the first component. The first reflective film and the second reflective film constitute a Fabry-Perot interferometer.

Advantageous Effects of Embodiment of Invention

As described above, according to embodiment of the present invention, electric charge is injected into the first component formed with a material that has an electrostrictive effect and transmits light. Thus, the drive voltage of the wavelength-tunable optical filter using an electrostrictive crystal can be lowered.

DETAILED DESCRIPTION OF ILLUSTRATIVE EMBODIMENTS

The following is a description of wavelength-tunable optical filters according to embodiments of the present invention.

First Embodiment

Figure 1:
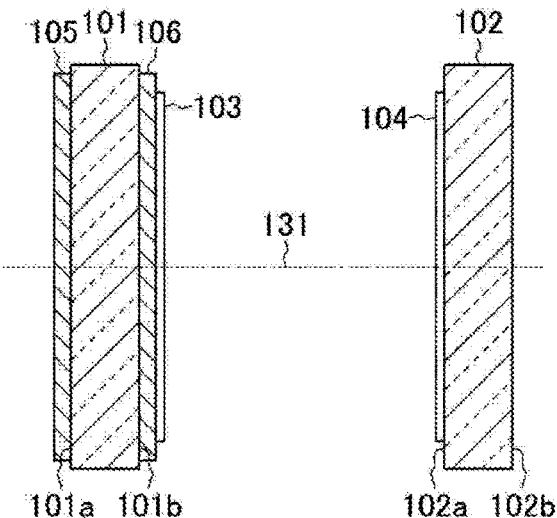
FIG. 1 is a cross-sectional view illustrating a configuration of a wavelength-tunable optical filter according to a first embodiment of the present invention.

First, a wavelength-tunable optical filter according to a first embodiment of the present invention is described with reference to FIG. 1. The wavelength-tunable optical filter includes a plate-like first component 101, a plate-like second component 102, a first reflective film 103, and a second reflective film 104.

The first component 101 includes a first incident surface 101a, and a first emission surface 101b disposed on the side opposite to the first incident surface 101a. Further, the first component 101 is formed with a material that has an electrostrictive effect and transmits light. The first component 101 can be formed with a dielectric material having an electrostrictive effect, for example. The first component 101 is formed with a material having high transparency to light in the target wavelength band.

The first component 101 can be formed with either a KTN $[KTa_{1-\alpha}Nb_{\alpha}O_3$ $(0<\alpha<1)]$ crystal or a lithium-added KLTN $[K_{1-\beta}Li_{\beta}Ta_{1-\alpha}Nb_{\alpha}O_3$ $(0<\alpha<1, 0<\beta<1)]$ crystal, for example. A KTN crystal or a KLTN crystal is known as a crystal having an electrostrictive effect. It is known that the electrostrictive effect of these crystals can obtain the amount of strain proportional to the square of the electric field defined by the voltage/interelectrode distance. Also, the first component 101 can be formed with barium titanate ($BaTiO_3$), lithium niobate ($LiNbO_3$), calcium fluoride ($CaF_2$), or the like. Note that, in the first component 101, the surface accuracy (maximum shape error) of the first incident surface 101a and the first emission surface 101b can be about one-tenth of the wavelength of the target light.

The second component 102 includes a second incident surface 102a, and a second emission surface 102b disposed on the side opposite to the second incident surface 102a. Further, the second component 102 is formed with a light transmissive material. The second component 102 can be formed with a material having high transparency to light in the target wavelength band. The second component 102 can be formed with BK7 glass or quartz glass, for example. Also, the second component 102 can be formed with either a KTN $[KTa_{1-\alpha}Nb_{\alpha}O_3$ $(0<\alpha<1)]$ crystal or a lithium-added KLTN $[K_{1-\beta}Li_{\beta}Ta_{1-\alpha}Nb_{\alpha}O_3$ $(0<\alpha<1, 0<\beta<1)]$ crystal. Also, the second component 102 can be formed with barium titanate ($BaTiO_3$), lithium niobate ($LiNbO_3$), calcium fluoride ($CaF_2$), or the like. Note that, in the second component 102, the surface accuracy (maximum shape error) of the second incident surface 102a and the second emission surface 102b can be about one-tenth of the wavelength of the target light.

Here, the first incident surface 101a and the first emission surface 101b of the first component 101 are disposed on an optical axis (optical path) 131, and the second incident surface 102a and the second emission surface 102b of the second component 102 are also disposed on the optical axis 131. Further, the distance between the first incident surface 101a and the second incident surface 102a is constant on the optical axis 131. For example, if the first component 101 and the second component 102 are securely disposed on a surface plate (not illustrated in the drawing), the distance between the first incident surface 101a and the second incident surface 102a can be fixed on the optical axis 131.

Meanwhile, the first reflective film 103 is formed on the first emission surface 101b, and partially reflects light. The second reflective film 104 is formed on the second incident surface 102a, and partially reflects light. The first reflective film 103 and the second reflective film 104 constitute a Fabry-Perot interferometer that has the distance between them as a resonator length.

Here, the first emission surface 101b and the second incident surface 102a can be arranged to face each other, and be parallel to each other. Also, the first incident surface 101a and the first emission surface 101b can be parallel to each other. Likewise, the second incident surface 102*a* and the second emission surface 102*b* can be parallel to each other.

Note that, in a case where a reflecting optical system or the like is disposed between the first emission surface 101*b* and the second incident surface 102*a* to bend the optical axis 131 in the middle, there is no need to arrange the first emission surface 101*b* and the second incident surface 102*a* so as to face each other. For example, the first emission surface 101*b* and the second incident surface 102*a* can be surfaces perpendicular to the optical axis 131. Here, the positional relationship between the first emission surface 101*b* and the second incident surface 102*a* described above is synonymous with the relationship between the reflective surface of the first reflective film 103 and the reflective surface of the second reflective film 104.

The wavelength-tunable optical filter according to the embodiment also includes a first transparent electrode 105 and a second transparent electrode 106 that serve as a voltage applying part that applies a voltage so that an electric field is generated in the thickness direction of the first component 101, and as a charge injecting part that injects electric charge into the first component 101. The first transparent electrode 105 is formed on the first incident surface 101*a*, and is in ohmic connection (contact) with the first component 101. The second transparent electrode 106 is formed between the first emission surface 101*b* and the first reflective film 103, and is in ohmic connection (contact) with the first component 101. For example, a voltage can be applied so that the first transparent electrode 105 serves as an anode, and the second transparent electrode 106 serves as a cathode.

The first transparent electrode 105 and the second transparent electrode 106 can be formed with indium tin oxide (ITO), for example. As long as the first component 101 is formed with a KTN crystal or a KLTN crystal, the first transparent electrode 105 and the second transparent electrode 106 formed with ITO are in ohmic connection with the first component 101. For example, in a case where the first component 101 is formed with a KTN crystal or a KLTN crystal, the transparent electrodes are formed with a material having a work function of less than 5.0 eV, so that charge injection can be realized. Note that the distance between the first transparent electrode 105 and the second transparent electrode 106, which is the thickness of the first component 101, can be smaller than the beam diameter of light.

When a voltage is applied to the first transparent electrode 105 and the second transparent electrode 106 by a voltage source (not illustrated in the drawing), an electric field is generated in the first component 101 in the thickness direction. In addition to that, according to the embodiment, the first transparent electrode 105 and the second transparent electrode 106 are in ohmic connection with the first component 101, and thus, electric charge (electrons) is injected into the first component 101. In this manner, warpage that protrudes toward the electrode serving as the cathode occurs in the first component 101 into which electric charge is injected in addition to the application of the voltage. As described later, this is because, in addition to the electric field generated by the application of the voltage, the electric field of the internal charge generated by the injected charge acts on the first component 101. As a result, according to the embodiment, even when the same voltage is applied, the displacement of the first component 101 can be made larger than that in a conventional case. As a result, according to the embodiment, the drive voltage of the wavelength-tunable optical filter using an electrostrictive crystal can be lowered.

Here, the magnitude of the displacement described above depends on the applied voltage, and accordingly, can change with a change in the voltage. Also, the Fabry-Perot interferometer transmits light, having a resonator length that is an integral multiple of the half wavelength. Accordingly, when a voltage is applied to the first component 101 via the first transparent electrode 105 and the second transparent electrode 1o6, and the resonator length is changed with the electrostrictive effect, the wavelength to be filtered can be changed.

Here, an electrostrictive effect is explained. As described in Reference Literature 1, two electrodes are formed so as to sandwich a KTN crystal, and a voltage is applied to these electrodes to generate an electrostrictive effect. The crystal extends in the electric field direction, and is displaced so as to contract in a direction perpendicular to the electric field. As described above, in a case where the first transparent electrode and the second transparent electrode are formed on the two surfaces of the plate-like first component, the electric field direction is the thickness direction. The strain caused by the electrostrictive effect is expressed as in the expression shown below, where e represents the strain, Q represents the electrostrictive coefficient, and P represents the polarization.

$$[e] = [Q][PP] \qquad \text{Equation 1}$$

$$[e] = \begin{bmatrix} e_{xx} \\ e_{yy} \\ e_{zz} \\ e_{yz} \\ e_{zx} \\ e_{xy} \end{bmatrix},$$

$$[Q] = \begin{bmatrix} Q_{11} & Q_{12} & Q_{12} & 0 & 0 & 0 \\ Q_{12} & Q_{11} & Q_{12} & 0 & 0 & 0 \\ Q_{12} & Q_{12} & Q_{11} & 0 & 0 & 0 \\ 0 & 0 & 0 & Q_{44} & 0 & 0 \\ 0 & 0 & 0 & 0 & Q_{44} & 0 \\ 0 & 0 & 0 & 0 & 0 & Q_{44} \end{bmatrix},$$

$$[PP] = \begin{bmatrix} P_x P_x \\ P_y P_y \\ P_z P_z \\ P_y P_z \\ P_z P_x \\ P_x P_y \end{bmatrix}$$

The polarization P is proportional to the electric field E. When the internal charge of the KTN crystal is 0 C/m³, the electric field E due to the external voltage is expressed as E=V/d, where V (>0) represents the voltage, and d represents the distance between the two electrodes (interelectrode distance=plate thickness). Accordingly, the electric field E is inversely proportional to the interelectrode distance, and thus, shortening the interelectrode distance (reducing the plate thickness) contributes to a decrease in the drive voltage.

This electrostrictive effect is a phenomenon that occurs when the KTN crystal is a cubic crystal. The crystal structure of the KTN crystal depends on temperature, and becomes a cubic crystal when the crystal is at or above Curie temperature. Also, the relative permittivity εr of the KTN crystal is used above 10,000, and accordingly, the polarization P can be regarded as proportional to the relative permittivity εr. Since the relative permittivity εr has temperature dependence, temperature control is also important in stably generating the electrostrictive effect.

Further, as described in Reference Literature 2, in a case where electrodes are in ohmic contact with a KTN crystal, when a high voltage is applied between the two electrodes, electrons are injected into the KTN crystal. Where d represents the interelectrode distance, co represents the dielectric constant of vacuum, $\varepsilon_r$ represents the relative permittivity, p represents the electron density, z represents the position in a direction (the thickness direction) perpendicular to the electrode surface, the anode is at the position expressed as z=−d/2, and the cathode is at the position expressed as z=d/2, the electric field $Ez_{(in)}$ generated inside the KTN crystal at the position z by the internal charge is expressed as in the expression shown below according to Gauss's law.

$$E_{z(in)}(z) = \frac{\rho}{\varepsilon_0 \varepsilon_r} z \qquad \text{Equation 2}$$

Figure 2:
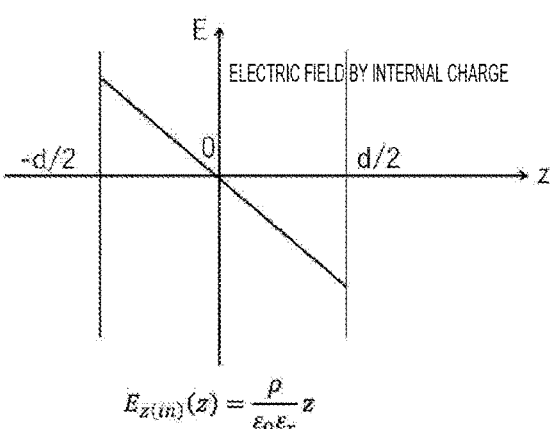
FIG. 2 is a characteristic diagram illustrating the change caused in an electric field $Ez_{(in)}$ at a position z inside a KTN crystal by an internal charge, the position z being the position in a direction perpendicular to an electrode surface in a first component using the KTN crystal.

In the case of the KTN crystal, electrons are injected as internal charges, and therefore, ρ has a negative value. Therefore, the relationship between the position z and the electric field $Ez_{(in)}$ is a linear expression of z with a negative slope (FIG. 2). When an external voltage is applied, an electric field generated by the external voltage is also added to the above expression, and therefore, the electric field Ez to be applied to the KTN crystal is as shown below.

$$E_z = \frac{\rho}{\varepsilon_0 \varepsilon_r} z + \frac{V}{d} \qquad \text{Equation 3}$$

Figure 3:
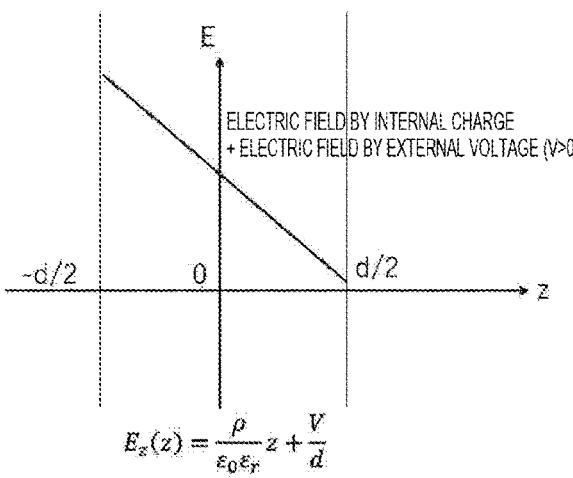
FIG. 3 is a characteristic diagram illustrating the change caused in an electric field Ez at the position z inside the KTN crystal when the electric field generated by an external voltage is added to the electric field generated by an internal charge, the position z being the position in a direction perpendicular to the electrode surface in the first component using the KTN crystal.

Accordingly, as can be seen from FIG. 3, the magnitude of the electric field in the vicinity of the anode (z=−d/2) is greater than the magnitude of the electric field in the vicinity of the cathode (z=d/2).

Further, since the relative permittivity $\varepsilon_r$ of KTN satisfies $1 \ll \varepsilon_r$, the polarization Pz satisfies the relationship shown below.

$$P_z \sim \varepsilon_0 \varepsilon_r E_z \qquad \text{Equation 4}$$

Where if $E_x = E_y = 0$, then $P_x = P_y = 0$, and $e_{xx}$, $e_{yy}$, and $e_{zz}$ can be described as follows.

$$e_{xx} = Q_{12} P_z^2 \sim Q_{12}(\varepsilon_0 \varepsilon_r)^2 E_z^2 \qquad \text{Equation 5}$$
$$e_{yy} = Q_{12} P_z^2 \sim Q_{12}(\varepsilon_0 \varepsilon_r)^2 E_z^2$$
$$e_{zz} = Q_{11} P_z^2 \sim Q_{11}(\varepsilon_0 \varepsilon_r)^2 E_z^2$$

Here, $Q_{11} > 0$, and $Q_{12} < 0$. Therefore, it is apparent that the crystal expands in the Z-axis direction (the thickness direction), and the crystal contracts in the X-axis direction and the Y-axis direction. Further, in a case where the relationship shown in the expression below is satisfied, $e_{zz}$ monotonically decreases in the Z-axis direction. That is, the magnitude of the strain on the cathode side is small, and the magnitude of the strain on the anode side is large.

$$\left| \frac{\rho}{\varepsilon_0 \varepsilon_r} \frac{d}{2} \right| \le \frac{V}{d} \qquad \text{Equation 6}$$

Figure 4:
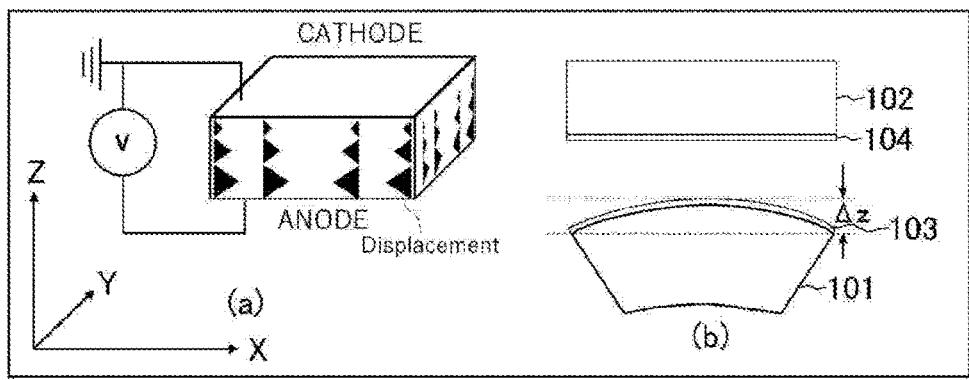
FIG. 4 is an explanatory view for explaining that the KTN crystal in which the electric field generated by the internal charge is added to the electric field generated by the external voltage warps so that the cathode side protrudes.

In view of the above, the amount of contraction of the crystal in the X-axis direction and the Y-axis direction varies depending on the position z in the Z-axis direction, as shown in FIG. 4(a). Note that, in FIG. 4 (a), the amount of the contraction described above is indicated by the size of each black triangle. As illustrated in FIG. 4(a), the amount of contraction is larger at a position closer to the anode. As a result, warpage that protrudes toward the cathode side occurs in the crystal having an electrostrictive effect.

The difference (displacement) in the centroid position of the crystal surface on the cathode side between when the applied voltage is 0 V and when the voltage is applied is defined as Δz. Also, the distance of the centroid position of the crystal surface on the cathode side from the centroid position of the crystal surface on the anode side when no voltage is applied is defined as d1. Further, the distance of the centroid position of the crystal surface on the cathode side from the centroid position of the crystal surface on the anode side when there is no internal charge but a voltage is applied is defined as d1'. Also, the distance of the centroid position of the crystal surface on the cathode side from the centroid position of the crystal surface on the anode side when there is an internal charge, and a voltage is applied is defined as d2. The relationship among these distances is expressed as d1<d1'<d2.

The resonator length of the Fabry-Perot resonator that includes the first reflective film 103 formed on the first component 101 and the second reflective film 104 formed on the second component 102 is defined as the distance between the first reflective film 103 and the second reflective film 104. This resonator length is shortened by displacement of the first component 101 having a voltage applied thereto. In other words, the resonator length changes by the amount equivalent to the displacement Δz [FIG. 4(b)]. As described above, according to the first embodiment, the first component 101 has an internal charge, and therefore, the first component 101 having a voltage applied thereto warps so as to protrude toward the cathode side. As a result, the displacement Δz is larger than that in a case where there is no internal charge, and a larger change in the resonator length can be obtained even at the same voltage.

Figure 5:
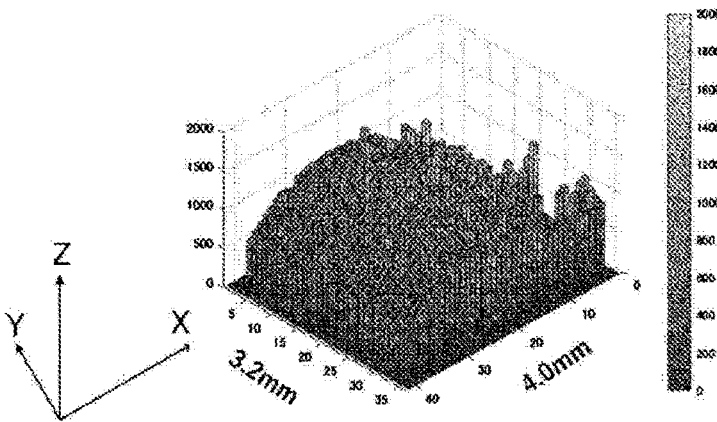
FIG. 5 is a characteristic diagram illustrating measured values of a displacement distribution in the Z-axis direction when a constant voltage of 400 V is applied to an electrode in ohmic contact with the KTN crystal.

FIG. 5 shows values of the displacement distribution measured in the Z-axis direction when a constant voltage of 400 V was applied to a KTN crystal. In FIG. 5, the X-axis and the −Y axis indicate the position of the crystal, and the Z-axis indicates the displacement, which is the result of measurement of the displacement of the cathode surface when a voltage of 400 V was applied. The displacement was measured with a laser displacement meter. The size of the KTN crystal is 4×3.2×1.2 mm, and a titanium electrode is formed on the 4×3.2 surface. This titanium electrode has a small work function, and electric charge is injected when a high voltage (>200 V) is applied thereto. Therefore, as described with reference to FIG. 4, displacement that causes the cathode surface to protrude is expected to appear, and displacement that caused the cathode surface of the KTN crystal to protrude was actually confirmed. Note that the numbers on the Z-axis in FIG. 5 are of any appropriate unit.

Second Embodiment

Figure 6:
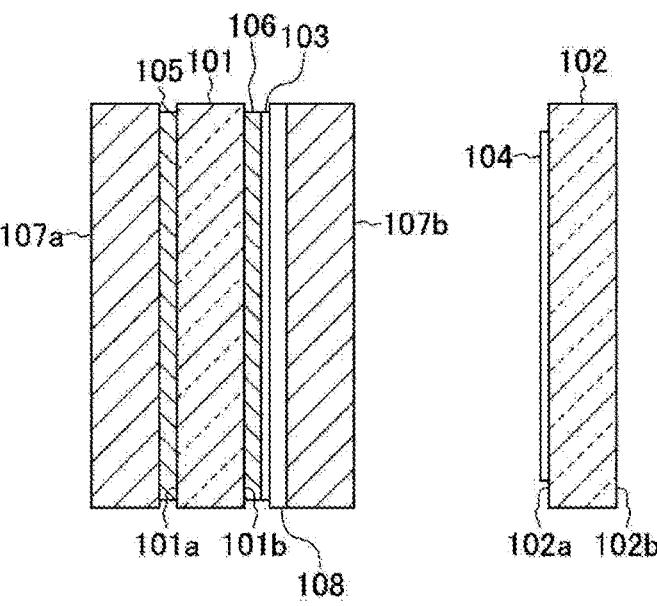
FIG. 6 is a cross-sectional view illustrating a configuration of a wavelength-tunable optical filter according to a second embodiment of the present invention.

Next, a wavelength-tunable optical filter according to a second embodiment of the present invention is described with reference to FIG. 6. This wavelength-tunable optical filter includes a first component 101, a second component 102, a first reflective film 103, a second reflective film 104, a first transparent electrode 105, and a second transparent electrode 106, as in the first embodiment described above.

In the second embodiment, the wavelength-tunable optical filter includes a first holder 107a and a second holder 107b that sandwich and hold a stack structure that is formed with the first transparent electrode 105, the first component 101, the second transparent electrode 106, and the first reflective film 103. The wavelength-tunable optical filter further includes an elastic sheet 108 that is disposed between the first reflective film 103 and the second holder 107b, and elastically deforms in the thickness direction. The elastic sheet 108 can be formed with graphite or carbon, for example. Although not illustrated in the drawing, a Peltier element can be provided in the first holder 107a. As the Peltier element is provided, the temperature of the first component 101 can be controlled to be constant via the first holder 107a formed with metal. In a case where temperature control is performed in this manner, the holders are preferably formed with a metal having a heat conductivity that is higher than 50 W/(m×K).

The first holder 107a and the second holder 107b can be formed with a metal such as Au, for example. Also, a hole penetrating through the first holder 107a and the second holder 107b in the optical axis direction is formed, so that the target light can pass through the hole. Likewise, a hole penetrating through the elastic sheet 108 in the optical axis direction is formed, so that the target light can pass through the hole.

For example, the first component 101 formed with a KTN crystal can be a plate in a square shape that has a side of 5 mm and a thickness of 0.5 mm. Meanwhile, the first transparent electrode 105 and the second transparent electrode 106 formed with ITO can be in a square shape that has a side of 5 mm in a planar view. Further, the first reflective film 103 can be formed with a dielectric multilayer film having a reflectance of 99%. Note that an antireflective film can be formed on a surface of the first transparent electrode 105. Meanwhile, the second component 102 can be formed with quartz glass. Further, in the first holder 107a, the second holder 107b, and the elastic sheet 108, a hole of $5 mm can be formed at the central portion in a planar view. Also, in a case where a Peltier element is provided, its outer shape can be similar to that of the first holder 107a, and a hole of $5 mm can be formed at the central portion thereof in a plan view, as in the first holder 107a.

Meanwhile, it is known that the configuration in which the first component 101 is sandwiched between the first holder 107a and the second holder 107b formed with a rigid material such as a metal has a risk of being damaged when the first component 101 vibrates due to an electrostrictive effect caused by application of a high-frequency voltage (Reference Literature 3). Therefore, the elastic sheet 108 is used to absorb the vibration mentioned above, and thus, damage of the first component 101 can be prevented.

Here, elastic sheets can be provided on both surfaces of the first component, but it is possible to obtain a larger displacement by providing an elastic sheet only on one side (cathode side). This aspect is now explained with reference to FIGS. 7A and 7B.

Figure 7A:
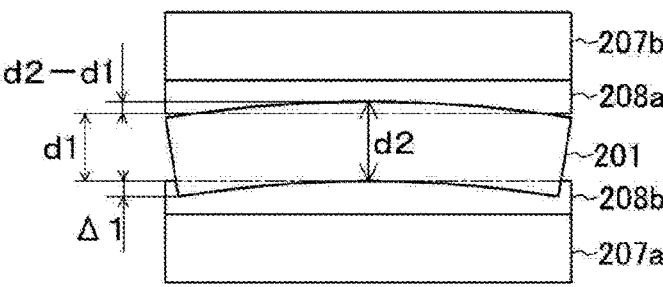
FIG. 7A is an explanatory view for explaining the displacement in a case where elastic sheets are provided on both surfaces of the first component.

As illustrated in FIG. 7A, a case where an elastic sheet 208a and an elastic sheet 208b are provided on both surfaces of a first component 201, and these components are sandwiched between a first holder 207a and a second holder 207b is now described. When a voltage is applied to the first component 201 having an internal charge, the first component 201 warps so that its cathode side protrudes, as illustrated in FIG. 7A. In this state, the distance of the centroid position of the crystal surface on the cathode side from the centroid position of the crystal surface on the anode side is defined as d2.

Here, the central portion of the warped first component 201 on the cathode side pushes into the elastic sheet 208a, and the end portions on the anode side push into the elastic sheet 208b. In this state, the centroid position of the crystal surface of the first component 201 on the anode side does not significantly change, and the end portions push into the elastic sheet 208b by the amount equivalent to the displacement Δ1 caused by the warpage. As a result, the centroid position of the crystal surface of the first component 201 on the cathode side moves toward the second component (not illustrated) by the amount equivalent to "d2−d1", from the state with d1 in which no voltage is applied.

Figure 7B:
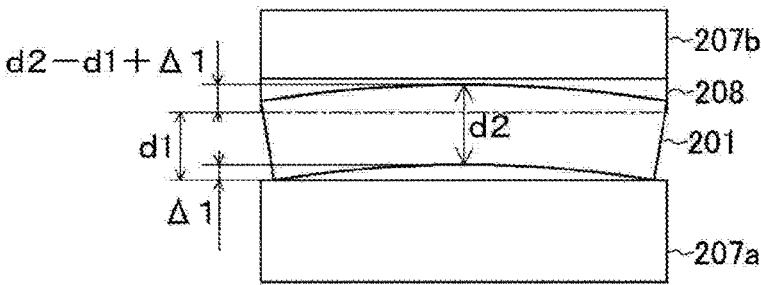
FIG. 7B is an explanatory view for explaining the displacement in a case where an elastic sheet is provided on one surface of the first component.

On the other hand, as illustrated in FIG. 7B, a case where an elastic sheet 208 is provided on the first component 201 on the side of the second component (not illustrated), and these components are sandwiched between the first holder 207a and the second holder 207b is now described. When a voltage is applied to the first component 201 having an internal charge, the first component 201 warps so that its cathode side protrudes, as illustrated in FIG. 7B. In this state, the distance of the centroid position of the crystal surface on the cathode side from the centroid position of the crystal surface on the anode side is defined as d2.

Here, the central portion of the warped first component 201 on the cathode side pushes into the elastic sheet 208. However, since the first holder 207a that is a rigid material is present on the anode side, the end portions on the anode side do not push into the first holder 207a. In this state, the centroid position of the crystal surface of the first component 201 on the anode side moves from the initial surface of the first holder 207a toward the cathode by the amount equivalent to the displacement Δ1 caused by the warpage. As a result, the centroid position of the crystal surface of the first component 201 on the cathode side moves toward the second component (not illustrated) by the amount equivalent to "d2−d1+Δ1", from the state with d1 in which no voltage is applied. As an elastic sheet is provided only on the cathode side of the first component in this manner, a larger displacement can be obtained.

Figure 8:
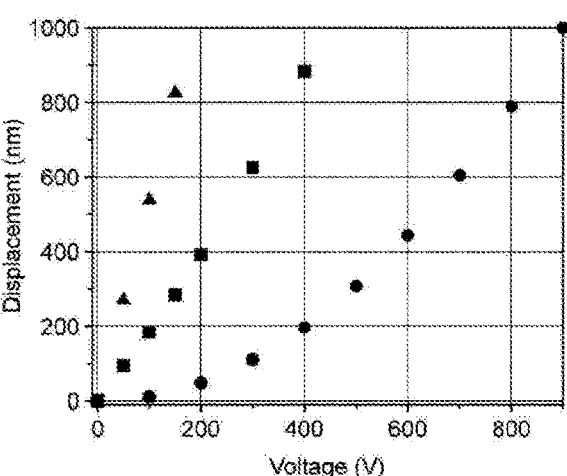
FIG. 8 is a characteristic diagram illustrating the results obtained when the relationship between the displacement of a KTN crystal due to an electrostrictive strain and the drive voltage is calculated by a finite element method.

FIG. 8 shows the results obtained when the relationship between the displacement of a KTN crystal due to an electrostrictive strain and the drive voltage was calculated by a finite element method. The first component is formed with a KTN crystal, and is a plate in a square shape that has a side of 5 mm and a thickness of 0.5 mm. Also, these are the results of calculation performed on the assumption that a voltage was applied to both surfaces of a square of 5×5 mm in a planar view, with an internal charge of −60 C/m³. In FIG. 8, triangles represent the result of warpage displacement added to displacement caused by voltage application. This is the case where the displacement is "d2−d1+Δ1" described above. Also, in FIG. 8, squares indicate the result of the warpage displacement "d2−d1" described above. Further, in FIG. 8, circles indicate the result in a case where there was no displacement due to warpage.

In a case where there is no internal charge, and no warpage occurs, a voltage of 600 V is required to obtain a displacement of 400 nm, as indicated by the circles. However, in a case where there is warpage, it is apparent that the required voltage is only 200 V, as indicated by the squares. As described above, in a state with warpage, a larger displacement can be obtained with a lower drive voltage than in a warpage-free state. Further, under the condition that the displacement can be set to "d2−d1+Δ1", it is apparent that a voltage of 100 V is sufficient to achieve a displacement of 400 nm, as indicated by the triangles. As described above, it is possible to lower the required voltage to about ⅙, depending on the conditions. This corresponds to the fact that the voltage required for sweeping 100 nm about a wavelength of 1300 nm is only required to be 100 Vpp.

Third Embodiment

Figure 9A:
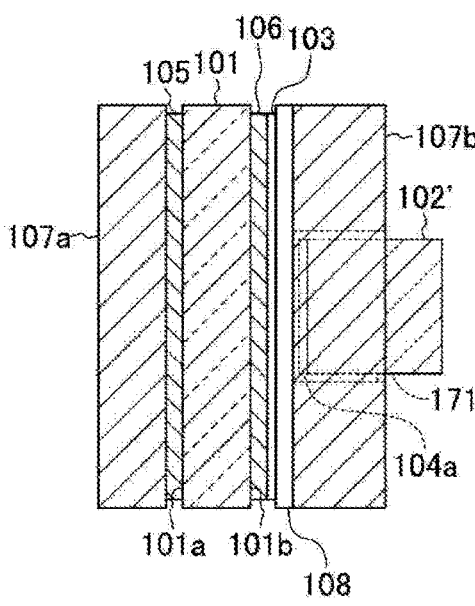
FIG. 9A is a cross-sectional view illustrating a configuration of a wavelength-tunable optical filter according to a third embodiment of the present invention.
Figure 9B:
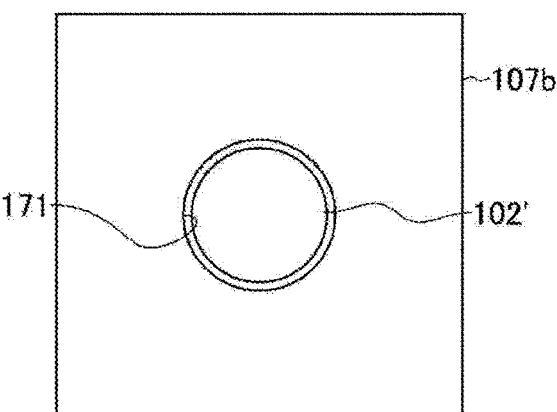
FIG. 9B is a plan view illustrating part of the configuration of the wavelength-tunable optical filter according to the third embodiment of the present invention.

Next, a wavelength-tunable optical filter according to a third embodiment of the present invention is described with reference to FIGS. 9A and 9B. This wavelength-tunable optical filter includes a first component 101, a second component 102', a first reflective film 103, a second reflective film 104a, a first transparent electrode 105, and a second transparent electrode 106, as in the first embodiment described above. The wavelength-tunable optical filter also includes a first holder 107a and a second holder 107b, and an elastic sheet 108 disposed between the first reflective film 103 and the second holder 107b, as in the second embodiment described above.

In the third embodiment, the second component 102' has a cylindrical shape, and the second reflective film 104a is formed on one end face thereof. For example, where the diameter of a hole 171 penetrating the second holder 107b in the optical axis direction is ϕ5 mm, the shape of the second component 102' can be ϕ2.5 to 4.5 mm, which is smaller than the diameter of the hole 171. With this arrangement, the second component 102' can be disposed and inserted into the hole 171, and the second component 102' can be held in the hole 171 serving as a holding portion. With this configuration, even when the second holder 107b that is thick in the optical axis direction is used, it is possible to form a resonator in which the distance between the second reflective film 104a and the first reflective film 103 is shorter.

Fourth Embodiment

Figure 10:
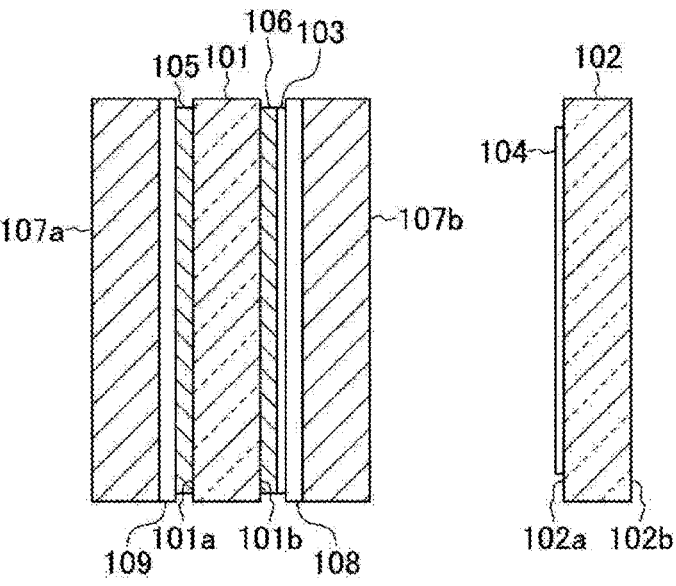
FIG. 10 is a cross-sectional view illustrating a configuration of a wavelength-tunable optical filter according to a fourth embodiment of the present invention.

Next, a wavelength-tunable optical filter according to a fourth embodiment of the present invention is described with reference to FIG. 10. This wavelength-tunable optical filter includes a first component 101, a second component 102, a first reflective film 103, a second reflective film 104, a first transparent electrode 105, and a second transparent electrode 106, as in the first embodiment described above. The wavelength-tunable optical filter also includes a first holder 107a and a second holder 107b, and an elastic sheet 108 disposed between the first reflective film 103 and the second holder 107b, as in the second embodiment described above.

In the fourth embodiment, the wavelength-tunable optical filter further includes an elastic sheet (another elastic sheet) 109 disposed between the first transparent electrode 105 and the first holder 107a. The elastic sheet 109 is formed with a material that has an elastic modulus or a hardness higher than that of the elastic sheet 108. With this configuration, in a case where the first component 101 warps, the amount of the end portions of the first component 101 entering the elastic sheet 109 can be reduced, and the decrease in the displacement to the cathode side can be reduced.

Figure 11:
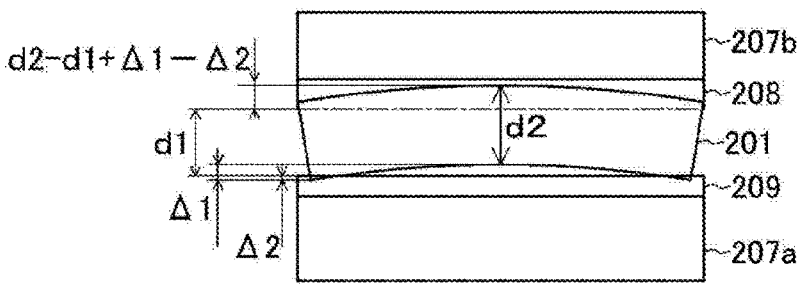
FIG. 11 is an explanatory view for explaining the displacement in a case where different elastic sheets are provided on both surfaces of the first component.

This aspect is now described with reference to FIG. 11. A case where an elastic sheet 208 and an elastic sheet 209 are provided on both surfaces of a first component 201, and these components are sandwiched between a first holder 207a and a second holder 207b is now described. The elastic sheet 209 is formed with a material that has an elastic modulus or a hardness higher than that of the elastic sheet 208.

When a voltage is applied to the first component 201 having an internal charge, the first component 201 warps so that its cathode side protrudes. In this state, the distance of the centroid position of the crystal surface on the cathode side from the centroid position of the crystal surface on the anode side is defined as d2.

Here, the central portion of the warped first component 201 on the cathode side pushes into the elastic sheet 208, and the end portions on the anode side push into the elastic sheet 209. For example, the end portions of the first component 201 push into the elastic sheet 209 by the amount equivalent to the displacement Δ2 caused by warpage toward the elastic sheet 209. Where the amount of displacement caused in the end portions by warpage toward the elastic sheet 209 on the anode side as viewed from the central portion is defined as Δ1, the elastic modulus or the hardness of the elastic sheet 209 is higher than that of the elastic sheet 208, and accordingly, $\Delta2 < \Delta1$. As a result, the centroid position of the crystal surface of the first component 201 on the cathode side moves toward the second component (not illustrated) by the amount equivalent to "d2−d1+Δ1−Δ2", from the state with d1 in which no voltage is applied.

The above-described displacement amount "d2−d1+Δ1−Δ2" is larger than the displacement amount "d2−d1" described with reference to FIG. 7A, by "Δ1−Δ2". Furthermore, since the elastic sheet 109 is also provided on the side of the first holder 107a, damage of the first component 101 due to vibration can be prevented more effectively than in a case where only the elastic sheet 108 is provided.

As described above, electric charge is injected into a first component formed with a material that has an electrostrictive effect and transmits light. Thus, the drive voltage of a wavelength-tunable optical filter using an electrostrictive crystal can be lowered.

Note that the present invention is not limited to the embodiments described above, and it is obvious that many modifications and combinations can be made by a person having ordinary knowledge in the art within the technical idea of the present invention.

REFERENCE LITERATURES

Reference Literature 1—S. Kawamura et al., "Temperature independent electrostrictive coefficients of $K_{0.95}Li_{0.05}Ta_{0.73}Nb_{0.27}O_3$ single crystals", Journal of Applied Physics, vol. 122, 114101, 2017.

Reference Literature 2—T. Imai et al., "Anomalous index modulations in electrooptic $KTa_{1-x}Nb_xO_3$ single crystals in relation to electrostrictive effect", Optics Express, vol. 23, no. 22, pp. 28784-28791, 2015.

Reference Literature 3—JP 2013-195916 A

REFERENCE SIGNS LIST 101 first component
101a first incident surface
101b first emission surface
102 second component
102a second incident surface
102b second emission surface
103 first reflective film
104 second reflective film
105 first transparent electrode
106 second transparent electrode
131 optical axis.

The invention claimed is:

1. A wavelength-tunable optical filter comprising:

a first plate-like component made of a material that has an electrostrictive effect and transmits light, the first plate-like component including a first incident surface and a first emission surface disposed on a side opposite to the first incident surface, the first incident surface and the first emission surface being disposed on an optical axis;

a second plate-like component made of a material that transmits the light, the second plate-like component including a second incident surface and a second emission surface disposed on a side opposite to the second incident surface, the second incident surface and the second emission surface being disposed on the optical axis;

a first reflective film on the first emission surface and configured to partially reflect the light;

a second reflective film on the second incident surface and configured to partially reflect the light;

a voltage applicator configured to apply a voltage in a thickness direction of the first plate-like component; and a charge injector configured to inject electric charge into the first plate-like component, wherein the first reflective film and the second reflective film collectively provide a Fabry-Perot interferometer.

2. The wavelength-tunable optical filter according to claim 1, wherein:

the first emission surface and the second incident surface face each other; and the first incident surface and the first emission surface are parallel to each other.

3. The wavelength-tunable optical filter according to claim 1, further comprising:

a first transparent electrode on the first incident surface and ohmically connected to the first plate-like component; and a second transparent electrode between the first emission surface and the first reflective film, the second transparent electrode being ohmically connected to the first plate-like component, wherein the first transparent electrode and the second transparent electrode provide the voltage applicator and the charge injector.

4. The wavelength-tunable optical filter according to claim 3, wherein:

the first plate-like component is made of a KTN [$KTa_{1-\alpha}Nb_\alpha O_3$ ($0<\alpha<1$)] crystal or a lithium-comprising KLTN [$K_{1-\beta}Li_\beta Ta_{1-\alpha}Nb_\alpha O_3$ ($0<\alpha<1$, $0<\beta<1$)] crystal; and the first transparent electrode and the second transparent electrode are each made of indium tin oxide.

5. The wavelength-tunable optical filter according to claim 3, further comprising:

a holder that sandwiches and holds a stack structure, the stack structure comprising the first transparent electrode, the first plate-like component, the second transparent electrode, and the first reflective film.

6. The wavelength-tunable optical filter according to claim 5, further comprising:

a first elastic sheet disposed between the first reflective film and the holder.

7. The wavelength-tunable optical filter according to claim 6, wherein:

the first elastic sheet is made of graphite or carbon.

8. The wavelength-tunable optical filter according to claim 6, further comprising:

a second elastic sheet having an anelastic modulus or a hardness higher than the first elastic sheet, the second elastic sheet being disposed between the first transparent electrode and the holder.

9. The wavelength-tunable optical filter according to claim 5, wherein the holder includes:

a first holder disposed on a side of the first transparent electrode; and a second holder disposed on a side of the first reflective film, wherein the second holder includes a holding portion that penetrates in a direction of the optical axis, and wherein the second plate-like component is held by the holding portion of the second holder.

10. The wavelength-tunable optical filter according to claim 1, wherein a distance between the first incident surface and the second incident surface on the optical axis is uniform.

11. A method comprising:

providing a first plate-like component made of a material that has an electrostrictive effect and transmits light, the first plate-like component including a first incident surface and a first emission surface disposed on a side opposite to the first incident surface, the first incident surface and the first emission surface being disposed on an optical axis;

providing a second plate-like component made of a material that transmits the light, the second plate-like component including a second incident surface and a second emission surface disposed on a side opposite to the second incident surface, the second incident surface and the second emission surface being disposed on the optical axis;

forming a first reflective film on the first emission surface, the first reflective film being configured to partially reflect the light;

forming a second reflective film on the second incident surface, the second reflective film being configured to partially reflect the light;

connecting a voltage applicator to the first plate-like component, the voltage applicator being configured to apply a voltage in a thickness direction of the first plate-like component; and connecting a charge injector to the first plate-like component, the charge injector being configured to inject electric charge into the first plate-like component, wherein the first reflective film and the second reflective film collectively provide a Fabry-Perot interferometer.

12. The method according to claim 11, wherein:

the first emission surface and the second incident surface face each other; and the first incident surface and the first emission surface are parallel to each other.

13. The method according to claim 11, wherein connecting the voltage applicator to the first plate-like component and connecting the charge injector to the first plate-like component comprises:

forming a first transparent electrode on the first incident surface and ohmically connected to the first plate-like component; and forming a second transparent electrode between the first emission surface and the first reflective film, the second transparent electrode being ohmically connected to the first plate-like component, wherein the first transparent electrode and the second transparent electrode provide the voltage applicator and the charge injector.

14. The method according to claim 13, wherein:

the first plate-like component is made of a KTN [$KTa_{1-\alpha}Nb_\alpha O_3$ ($0<\alpha<1$)] crystal or a lithium-comprising KLTN [$K_{1-\beta}Li_\beta Ta_{1-\alpha}Nb_\alpha O_3$ ($0<\alpha<1$, $0<\beta<1$)] crystal; and the first transparent electrode and the second transparent electrode are each made of indium tin oxide.

15. The method according to claim 13, further comprising:

forming a holder that sandwiches and holds a stack structure, the stack structure comprising the first transparent electrode, the first plate-like component, the second transparent electrode, and the first reflective film.

16. The method according to claim 15, further comprising:

forming a first elastic sheet disposed between the first reflective film and the holder.

17. The method according to claim 16, wherein:

the first elastic sheet is made of graphite or carbon.

18. The method according to claim 16, further comprising:

forming a second elastic sheet having an anelastic modulus or a hardness higher than the first elastic sheet, the second elastic sheet being disposed between the first transparent electrode and the holder.

19. The method according to claim 15, wherein the holder includes:

a first holder disposed on a side of the first transparent electrode; and a second holder disposed on a side of the first reflective film, wherein the second holder includes a holding portion that penetrates in a direction of the optical axis, and wherein the second plate-like component is held by the holding portion of the second holder.

20. The method according to claim 11, wherein:

a distance between the first incident surface and the second incident surface on the optical axis is uniform.

* * * * *